UNITED STATES PATENT OFFICE.

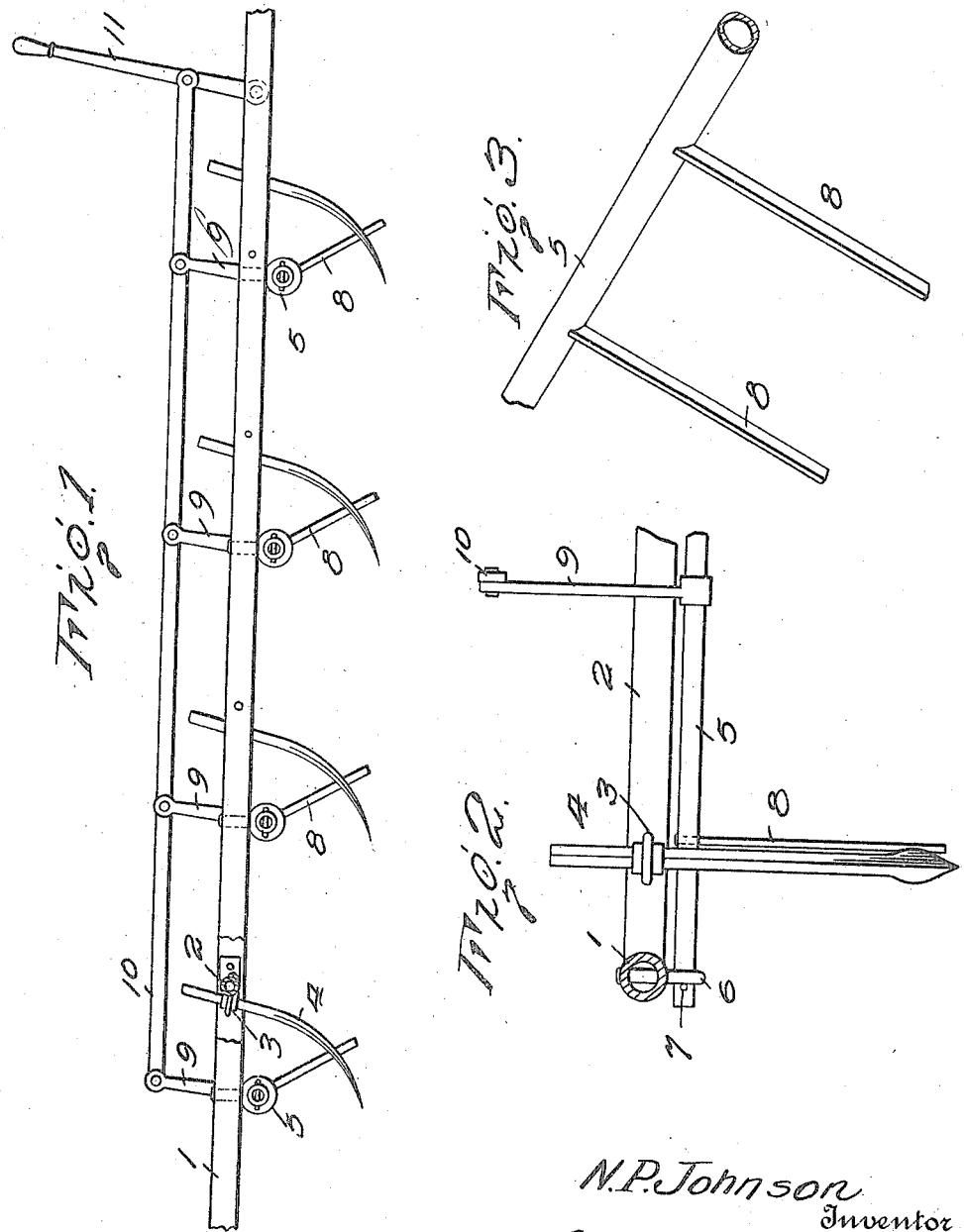

NILS P. JOHNSON, OF CROOKSTON, MINNESOTA.

HARROW-TOOTH CLEANER.

1,263,423. Specification of Letters Patent. Patented Apr. 23, 1918.

Application filed July 23, 1917. Serial No. 182,232.

*To all whom it may concern:*

Be it known that I, NILS P. JOHNSON, a citizen of the United States, and resident of Crookston, in the county of Polk and State of Minnesota, have invented certain new and useful Improvements in Harrow-Tooth Cleaners, of which the following is a specification.

This invention relates to harrows and it is the principal object of the invention to provide a harrow tooth cleaner whereby clods of earth and other matter as may accumulate between the teeth of the harrow can be readily and instantly removed therefrom to allow the efficient cultivation of the earth.

Another object of the invention is to provide means for moving the various harrow teeth cleaning elements collectively, thus, freeing all of the harrow teeth of matter in a single operation.

The foregoing together with additional advantageous details and arrangements of parts of the preferred embodiment of my invention will be clear from the specific description hereinafter contained, when read in connection with the accompanying drawings forming part thereof, wherein said embodiment of the invention is illustrated for the purpose of facilitating a full understanding of the present improvements.

In the drawings;

Figure 1 is a fragmentary longitudinal section through a harrow with my improved cleaning means applied thereto;

Fig. 2 is a fragmentary transverse section therethrough showing the mounting of the cleaning means; and Fig. 3 is a fragmentary detail in perspective of certain of the cleaning means and their mounting.

Referring now more particularly to the drawings and in connection with which like reference characters will refer to corresponding parts throughout the several views, 1 designates the frame of the harrow which may be and preferably is formed of piping and has disposed transversely thereof harrow tooth supporting pipes 2, these pipes 2 being provided with pairs of openings in order that substantially U-shaped clamping bolts 3 may be passed therethrough and the shank portions of the various harrow teeth 4 thus secured in position with relation to the harrow frame 1.

Other transverse pipes 5 are secured to the opposite sides of the frame 1 by passing U-shaped bolts 6 downwardly through the frame and engaging the opposite ends of the said pipes 5 thereby. In this way, it will be readily understood that the pipes 5 may be rotated due to their mode of engagement with the sides of the harrow frame 1. Further, to prevent undue lateral movement of the pipes 5, pins 7 are arranged in the opposite ends thereof and have bearing upon the outer sides of each of the U-shaped bolts 6.

Harrow teeth cleaning elements 8 are passed through diametrically disposed openings formed in the transverse pipes 5 and are secured in position therein by suitable means. In this connection, it is to be noted that the harrow teeth cleaning elements are arranged between the various harrow teeth and as a consequence, when the same are rocked they will serve as means for efficiently removing clods of earth or other matter which have accumulated therebetween during operation of the harrow.

To permit the collective operation of the harrow teeth cleaning elements, arms 9 are engaged with the various transversely disposed pipes 5 and are pivotally connected to an operating bar 10 extending longitudinally of the harrow frame 1. The rear end of the operating bar 10 is pivotally engaged with a lever 11 which is mounted on the harrow frame. Thus, when the said lever 11 is rocked, oscillatory motion will be imparted to the various pipes 5 and as a consequence to their harrow teeth cleaning elements respectively. Such movement, of course, will cause the harrow teeth cleaning elements to be moved between the various harrow teeth 4, whereupon they will immediately disengage clods of earth or the like from the same and allow the harrow to properly function.

Manifestly, the construction shown is capable of considerable modification, and such modification as is within the scope of my claims, I consider within the spirit of my invention.

I claim:

1. In a harrow having spaced rows of teeth, transversely disposed pipes secured to the opposite sides of the harrow frame and rotatable thereon, harrow teeth cleaning elements secured to said pipes and arranged between the teeth of the harrow, arms mounted on said transversely disposed pipes and means engaged with said arms for allowing collective movement of the cleaning elements.

2. In a harrow having spaced rows of teeth, transversely disposed pipes arranged adjacent the rows of teeth and rotatably mounted upon the opposite sides of the harrow frame, harrow teeth cleaning elements fixedly mounted on said pipes having their free ends extending between the harrow teeth, arms mounted upon said pipes, a longitudinally disposed operating bar connected to said arms, and a pivotal lever mounted on the frame and engaged with one end of the operating bar for moving the cleaning elements collectively.

3. In a harrow frame having spaced rows of teeth, pipes arranged transversely of the harrow frame and rotatable thereon, cleaning elements carried by said pipes and arranged between the teeth of the harrow and means engaged with said pipes for rotating the same collectively.

In testimony whereof, I affix my signature hereto.

NILS P. JOHNSON.

Copies of this patent may be obtained for five cents each, by addressing the "Commissioner of Patents, Washington, D. C.